(12) United States Patent
Meline et al.

(10) Patent No.: US 11,608,449 B2
(45) Date of Patent: Mar. 21, 2023

(54) WATER SHEDDING FINISH

(71) Applicant: Texstars, LLC, Grand Prairie, TX (US)

(72) Inventors: Ronald L. Meline, Arlington, TX (US); John Henry Sandoval, Dallas, TX (US)

(73) Assignee: Texstars, LLC, Grand Prairie, TX (US)

( * ) Notice: Subject to any disclaimer, the term of this patent is extended or adjusted under 35 U.S.C. 154(b) by 0 days.

(21) Appl. No.: 16/282,439

(22) Filed: Feb. 22, 2019

(65) Prior Publication Data
US 2019/0256740 A1  Aug. 22, 2019

Related U.S. Application Data

(60) Provisional application No. 62/633,764, filed on Feb. 22, 2018.

(51) Int. Cl.
| | | |
|---|---|---|
| *C09D 191/06* | (2006.01) | |
| *C09D 7/20* | (2018.01) | |
| *C09D 5/00* | (2006.01) | |
| *C08L 71/02* | (2006.01) | |
| *C08K 5/1535* | (2006.01) | |
| *C08K 5/41* | (2006.01) | |
| *C08K 5/19* | (2006.01) | |

(52) U.S. Cl.
CPC .......... *C09D 191/06* (2013.01); *C09D 5/00* (2013.01); *C09D 7/20* (2018.01); *C08K 5/1535* (2013.01); *C08K 5/19* (2013.01); *C08K 5/41* (2013.01); *C08L 71/02* (2013.01)

(58) Field of Classification Search
CPC .......... C09D 191/06; C09D 7/20; C09D 5/00; C08K 5/1535; C08K 5/19; C08K 5/41
See application file for complete search history.

(56) References Cited

U.S. PATENT DOCUMENTS

| | | | | |
|---|---|---|---|---|
| 2,906,640 A | * | 9/1959 | Bartlett | B05D 1/02 427/236 |
| 3,014,814 A | * | 12/1961 | McConica | B60S 1/52 427/165 |
| 3,433,750 A | * | 3/1969 | Fain | C08G 77/58 427/163.1 |
| 3,766,123 A | * | 10/1973 | Burnie | C08G 77/58 523/169 |
| 4,612,255 A | * | 9/1986 | Hein | A01N 37/02 514/498 |
| 4,927,668 A | * | 5/1990 | Senckowski | C03C 17/28 106/13 |
| 5,221,329 A | * | 6/1993 | Tarr | C09K 3/18 106/13 |
| 5,294,251 A | * | 3/1994 | Urena | C09D 191/08 106/271 |
| 5,945,482 A | * | 8/1999 | Fukuchi | C08L 33/16 525/100 |
| 6,685,765 B1 | * | 2/2004 | Ghodoussi | C09G 1/08 106/10 |
| 2003/0098438 A1 | * | 5/2003 | Haslin | C09K 3/185 252/70 |
| 2009/0127163 A1 | * | 5/2009 | Weiss | B01J 8/0438 208/99 |
| 2013/0005860 A1 | * | 1/2013 | Dananche | C04B 41/009 524/2 |
| 2015/0013877 A1 | * | 1/2015 | Earnshaw | B01F 11/0208 156/62.2 |
| 2015/0322272 A1 | * | 11/2015 | Pokroy | C09D 5/1681 428/141 |
| 2016/0074460 A1 | * | 3/2016 | Deo | A61K 8/9789 424/58 |
| 2017/0101551 A1 | * | 4/2017 | Phang | C09D 5/00 |

OTHER PUBLICATIONS

Roberts, et al. J. Chem. Eng. Data 1994, 39, 793-795 (Year: 1994).*
Rimetz ("The Great Hartford Circus Fire", ChemMatters, (2005), pp. 4-7.) (Year: 2005).*

* cited by examiner

*Primary Examiner* — Colin W. Slifka
*Assistant Examiner* — Michael Forrest

(57) ABSTRACT

A water shedding finish for aircraft or aerospace transparencies is prepared from a paraffin wax and at least a solvent linear or branched $C_6$ to $C_8$ alkane solvent. The finish may further include a surfactant and similarly the solvent may be present as a co-solvent system.

6 Claims, No Drawings

WATER SHEDDING FINISH

CROSS REFERENCE TO RELATED APPLICATION

This application is a completion application of co-pending U.S. Provisional Patent Application Ser. No. 62/633,764, filed Feb. 22, 2018 for "WATER SHEDDING FINISH", the disclosure of which is hereby incorporated by reference in its entirety.

BACKGROUND OF THE INVENTION

1. Field of the Invention

The present invention pertains to water shedding compositions. More particularly, the present invention pertains to water shedding finishes for plastic transparencies. Even more particularly, the present invention pertains to water shedding finishes for use with plastic aerospace and aircraft transparencies.

2. Prior Art

As is known to those skilled in the art to which the present invention pertains. plastic aerospace transparencies exhibit issues with regard to their inability to shed water that impinges on them and as a consequence may accumulate on them. Accumulation is most often encountered when the aircraft is resting on airfields. In other cases, the issue of impingement also arises and becomes dangerous, while landing, there may be water build-up which obscures the vision of the pilot.

Water shedding finishes for glass surfaces are known. Nevertheless. they do not exhibit the requisite properties for use with plastic aerospace transparencies. For example, the commercial water shedding formulae for glass contain fluorinated compounds or silicones designed to bond the formulation to glass. They provide large contact angles to water droplets so they more readily bead up and roll off the glass instead of spreading onto the glass. For aerospace transparencies, it is apparent that a given amount of wear and tear will ultimately remove the finish. This is acceptable as long as the finish can be re-applied; can survive a given amount of high-speed water impact, and not craze the aerospace transparency plastic. Present day commercial glass water shedding formulae do not meet these aerospace requirements.

Thus, it is to be thus appreciated that there is a need for an improved water shedding finish for aerospace transparencies which overcomes the inherent problems as described hereinabove.

SUMMARY OF THE INVENTION

In accordance with the present invention there is provided a water shedding finish particularly adapted for use with plastic aerospace transparencies.

In a first embodiment hereof the finish generally, comprises: an aqueous suspension of (a) paraffin wax in admixture with (b) a surfactant-solubilizer. The composition hereof is effective in providing the requisite finish to enhance water shedding capabilities for the type of transparency under consideration herein while avoiding crazing.

In a second embodiment hereof the water shedding finish, generally, comprises a homogeneous solution of paraffin wax and an aliphatic liquid solvent. Preferably, the solvent is either a linear or branched alkane having from about $C_6$ to $C_8$ carbon atoms and mixtures thereof. Preferably, the solvent is a mixture of heptanes.

For a more complete understanding of the present invention reference is made to the following detailed description and accompanying non-limiting examples.

DESCRIPTION OF THE INVENTION

At the outset it is important to note the difference between a polish and a finish. A polish contains an abrasive so it can be used to fix minor scratches and other optical defects. A finish, on the other hand, does not have an abrasive so it is used to provide a very thin treatment to the exterior surface of the coating on an aircraft or aerospace transparency. Therefore, it is to be understood that the present invention concerns water shedding finishes.

According to a first embodiment of the present finish, the first component hereof is paraffin wax. As is known to the skilled artisan, paraffin wax is a petroleum distillate solid comprising a mixture of hydrocarbons, which are predominantly alkanes. Paraffin wax is usually available as a white, tasteless and odorless solid. As a petroleum distillate it is water-insoluble. It has a boiling point above 300° C. and a melting point of about 60° C.

Also, as is known to the skilled artisan, paraffin wax has a contact angle of 110° and is inert with respect to crazing common plastic transparency surfaces such as acrylic and polyurethane coatings.

The second component of the present finish is a surfactant-chelant or solubilizer for the paraffin wax. The surfactant is utilized to suspend the paraffin in an aqueous system. Preferably, the surfactant is a quaternary ammonium compound and, in particular, a quaternary ammonium chloride compound. Most preferably, the surfactant is a di-alkyl quaternary ammonium chloride. Such compounds are well-known and commercially available. A particularly preferred quaternary ammonium compound is that sold commercially under the name Arquad 2C-75. This compound is described as a di-alkyl quaternary compound based on coconut fatty acid. It is available as a liquid in admixture with isopropyl alcohol.

Other useful surfactants include, for example, polysorbate such as that sold under the name Tween 60; polyoxyethylene cetyl ethers such as those sold under the name Brij by Signa Aldrich and, in particular, Brij 52; sodium dodecyl sulfate, copolymers having both hydrophilic group, such as polyoxyethylene groups and either an aromatic lipophilic or hydrophilic groups incorporated therewith (such as that sold under the name Triton X-100), and the like as well as mixtures thereof.

The finish hereof, generally, comprises from about 0.5 to about 5.0 parts, by weight, of paraffin wax, based upon 100 parts by weight, of the total weight of the finish and, preferably, from about 1.0 to about 7.0 parts, by weight, based on the total weight of the finish.

The surfactant is present in an amount ranging from about 0.3 to about 2.0 parts, by weight, based upon the total weight of the finish. Preferably, the surfactant is present in an amount ranging from about 0.5 to about 1.5 parts, by weight, based on the total weight of the finish.

A more stable homogenized finish can be obtained by using a co-solvent admixture such as (a) naphtha, linear or branched alkanes, including hexanes and heptanes, in admixture with (b) a glycol ether PM and the like as well as mixtures thereof. The co-solvent admixture, where used, is present in the finish, in an amount ranging from about 0.0 parts to more than about 10.0 parts, by weight, based on the total weight of the finish. Such minimal amount of the co-solvent admixture is used to so as not to impede crazing resistance and to preclude any VOC issues.

The balance of the finish is water.

The finish is prepared by admixing together, with stirring, the paraffin wax, the surfactant, the co-solvent where used, and water at a temperature ranging from 120° F. to 175° F. for a period of about 1.5 to about 3 hours. The result, after heating, is a suspension of the resultant wax in an aqueous medium. Thereafter, the so-obtained suspension is filtered through a suitable stainless-steel mesh to provide the final product.

The final product is a suspension having a milky color which is rendered homogeneous with a small amount of manual shaking.

The finish is applied to a transparency by any suitable mode, such as, for example, with a suitable buffing-type cloth such as cheese cloth which results in a clear finish being applied to the transparency.

In an alternate or second embodiment hereof there is provided a water shedding composition consisting essentially of a paraffin wax and either a linear or branched alkane having from about 6 to about 8 carbon atoms.

It has been found that an effective water shedding composition for aerospace or aircraft plastic transparencies meeting the necessary prerequisites can be achieved thereby.

According to this embodiment, the composition generally comprises from about 0.5 to about 4.0 parts, by weight, of the paraffin wax and from about 96.0 to about 99.5 part, by weight, of the alkane solvent. The composition is prepared by dissolving the wax in the solvent at a temperature ranging from about 120° F. to about 175° F. for a period of about 1.5 to about 3.0 hours to prepare a solution thereof which is then filtered to remove any impurities obtain the final finished product, which is a storage stable homogeneous solution.

For a more complete understanding of the following is an illustrative non-limiting example of the present finish. In the Examples all parts are by weight, absent contrary indications.

EXAMPLE I

Into a suitable vessel equipped with stirring means and heating means maintained at 160° F., with stirring, is charged: 2.0 parts of paraffin wax and 10 parts of heptane.

After the paraffin is dissolved, 0.7 parts of Arquad 2C-75 surfactant is added to the mixture. Thereafter, 87.3 parts of deionized water is added slowly added thereto.

After about 2.0 hours of heating and stirring there is obtained a milky suspension. The suspension is then filtered through a 100 OPI stainless steel media to obtain the final finished product.

The water shedding finish hereof can be replenished, easily polished away, if needed, and is readily able to be re-applied.

EXAMPLE II

Following the procedure of Example I, into a suitable vessel equipped with stirring means and heating means there is charged 2.0 parts, by weight, of the paraffin wax and 98 parts, by weight, of a mixture of linear and branched heptanes. With the stirring and with the vessel maintained at 160° F. after about two hours a homogeneous solution of the wax and the heptanes is obtained. While still hot the solution is filtered through a 100 OPI stainless steel medium to remove any unwanted impurities to obtain a final product. The final finished product is homogeneous, storage stable and can be readily applied in the same manner as that described hereinabove.

It is to be understood that this finish is equally useful with other plastic articles where water shedding is necessary or desirable without crazing or scratching the article.

Having, thus, described the invention what is claimed is:

1. A water shedding finish composition consisting essentially of an admixture or a homogeneous solution of (a) paraffin wax; (b) a surfactant; (c) a solvent selected from the group consisting of aliphatic linear or branched $C_6$ to $C_8$ alkanes or mixtures thereof; and (d) water,
   wherein the water shedding finish composition does not comprise a fluorinated or silicone component,
   wherein the paraffin wax and the solvent are mixed to dissolve the paraffin wax and form a solution prior to addition of the water,
   wherein the paraffin wax comprises a non-ionic paraffin wax,
   wherein the aliphatic linear or branched $C_6$ to $C_8$ alkane comprises heptane.

2. The water shedding finish composition of claim 1, wherein the paraffin wax is present in an amount ranging from about 0.5 to about 5 parts, by weight, of paraffin wax based on the total weight of the water shedding finish composition and from about 95 to about 99.5 parts, by weight, of the solvent.

3. The water shedding finish composition of claim 1, wherein the surfactant is selected from the group consisting of a quaternary ammonium compound, a polysorbate, polyoxyethylene cetyl ethers, sodium dodecyl sulfate, copolymers having both a hydrophilic group and either an aromatic lipophilic or hydrophilic group incorporated therewith, and mixtures thereof.

4. The water shedding finish composition of claim 1, wherein the surfactant is present in an amount ranging from 0.3 to about 2.0 parts, by weight, based on the total weight of the water shedding finish composition.

5. The water shedding finish composition of claim 1, wherein the solvent is a co-solvent comprising a mixture of the alkanes or glycol ether PM as well as mixtures thereof.

6. A plastic transparency of the type used for aerospace and/or airplane vision having applied thereto the water shedding finish composition of claim 1.

* * * * *